United States Patent Office 2,800,190
Patented July 23, 1957

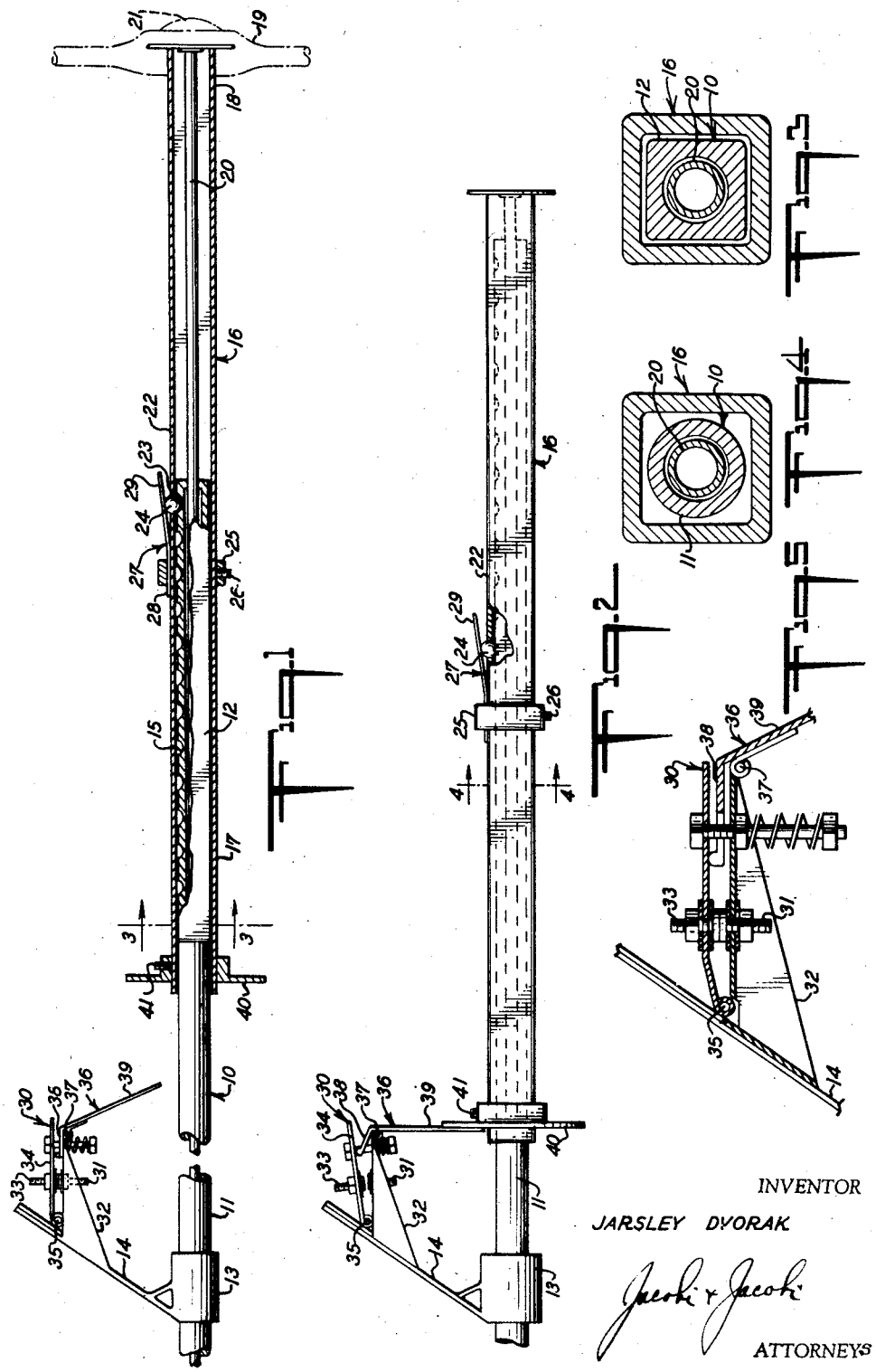

2,800,190

COMBINATION SAFETY STEERING COLUMN AND ELECTRICAL SYSTEM CONTROL FOR AUTOMOTIVE VEHICLES

Jarsley Dvorak, Melvin, Iowa

Application March 12, 1956, Serial No. 570,877

3 Claims. (Cl. 180—82)

This invention relates to transportation and more particularly to a combination steering column so constructed as to prevent or minimize injury to the driver of a vehicle in the event of an accident and at the same time to deenergize the electrical system of the vehicle in order to stop the same and at the same time to reduce the danger of fire.

Heretofore numerous types of collapsible steering columns or steering wheels have been proposed and utilized in order to minimize injury to the driver of a vehicle in the event of an accident but many of these were relatively complicated, costly, and difficult to install and furthermore the construction was such that these devices frequently failed to operate properly because of an accumulation of rust, dirt or other foreign material thereby rendering the same substantially useless as a safety device. Furthermore these prior art safety devices did not include or contemplate any means for deenergizing the electrical system of the vehicle in the event of an accident and consequently the motor of the vehicle might very well continue to run thereby causing further damage and also unless the electrical system is immediately deenergized upon the occurrence of an accident, the danger of fire is materially increased.

It is accordingly an object of the invention to provide a combination safety steering column and electrical system control for automotive vehicles which may be conveniently and economically constructed from readily available materials and also conveniently installed in new or existing motor vehicles.

A further object of the invention is the provision of a combination safety steering column and electrical system control for automotive vehicles including means for adjustably positioning the steering wheel with respect to the driver of the vehicle and for permitting downward movement of the steering wheel and steering column upon impact of the driver therewith to exert an excessive downward axial force on the steering wheel thereby substantially preventing or minimizing injury to the driver.

A still further object of the invention is the provision of a combination safety steering column and electrical system control for automotive vehicles which permits downward movement of the steering wheel and steering column upon impact therewith of the driver of the vehicle and in which frictional resistance to movement of the steering column due to an accumulation of rust, dirt or other foreign material is substantially eliminated.

Another object of the invention is the provision of a combination safety steering column and electrical system control for automotive vehicles including a steering column designed to move downwardly upon impact with the steering wheel or column by the driver of the vehicle and including switch means operable upon downward movement of the steering column to a predetermined position to deenergize the electrical system of the vehicle.

A further object of the invention is the provision of a combination safety steering column and electrical system control for automotive vehicles in which the steering column and steering wheel carried thereby may be adjusted with relation to the driver of the vehicle, such adjustment being accomplished merely by pulling or pushing on the steering wheel and not requiring the use of tools.

Further objects and advantages of the invention will be apparent from the following description taken in conjunction with the drawings wherein:

Fig. 1 is a longitudinal sectional view of a steering column and electrical system control constructed in accordance with this invention and showing the steering column in extended or operative position;

Fig. 2, a side elevational view of the steering column and electrical control shown in Fig. 1 with the steering column in collapsed or inoperative position and with the electrical system control actuated to deenergize the electrical system of the vehicle;

Fig. 3, a sectional view taken substantially on the line 3—3 of Fig. 1;

Fig. 4, a sectional view taken substantially on the line 4—4 of Fig. 2; and

Fig. 5, a fragmentary sectional view to an enlarged scale and showing the structure of the electrical system control switch.

With continued reference to the drawing there is shown a combination safety steering column and electrical system control for automotive vehicles constructed in accordance with this invention and which may well comprise a tubular shaft 10 having a lower portion 11 substantially circular in cross section and having an upper portion 12 substantially rectangular in cross section. The circular portion 11 of the shaft 10 is rotatably mounted in a bearing 13 which is carried by a bracket 14 which may be secured to the fire wall or other part of a vehicle, not shown, in which the apparatus of this invention is to be installed. The rectangular portion 12 of the shaft 10 is provided in one wall thereof with a plurality of longitudinally spaced outwardly opening recesses 15, the purpose of which will be presently described.

An elongated hollow member 16 substantially rectangular in cross section is telescopically and slidably received at the lower end 17 over the rectangular portion 12 of the shaft 10 and to the upper end 18 of the rectangular member 16 there is fixed a steering wheel 19 which may be conventional in every respect. A tube 20 may extend downwardly from the steering wheel 19 through the rectangular member 16 and the shaft 10 and such tube 20 may serve to carry a wire or other conductor, not shown, which is connected to a switch operated by the usual horn button 21 to energize the horn of the vehicle.

One wall 22 of the rectangular member 16 is provided intermediate the length thereof with an aperture 23 which serves to receive a ball detent 24 selectively engaging in one of the recesses 15 as clearly shown in Fig. 1. Surrounding the rectangular member 16 is a collar 25 and a set screw 26 is provided to clamp the collar 25 in adjusted longitudinal position on the rectangular member 16. A leaf spring 27 is provided with a base portion 28 received between the collar 25 and a wall of the rectangular member 16 to secure the spring 27 in place thereon and the opposite end 29 of the spring 27 engages the ball detent 24 to urge the same inwardly into firm engagement with one of the recesses 15 in the rectangular portion 12 of the shaft 10. While for convenience of illustration a ball detent has been shown and such type of detent is preferable, nevertheless if desired other types of detents may be employed such as a pin having a spherical inner end and if desired the leaf spring 27 may be replaced by a spring of any desired configuration such as a coiled compression spring and if desired means may be provided for adjusting the tension exerted by such spring on the detent.

Obviously engagement of the detent 24 in one of the recesses 15 will serve to releasably hold the rectangular member 16 in adjusted longitudinal position with relation to the shaft 10 and the rectangular member 16 may be moved axially of the shaft 10 by exerting an upward or downward force on the steering wheel 19 sufficient to displace the detent 24 from the recess 15 thereby permitting adjustment of the position of the steering wheel 19 with relation to the driver of the vehicle. In addition to this adjustable feature the structure above described provides as a primary feature a safety device which will minimize or prevent injury to the driver of the vehicle in the event of an accident and this function is accomplished upon impact of the driver of the vehicle with the steering wheel 19 or the upper end of the rectangular member 16 if the same is exposed and in the event such impact is sufficient to move the detent 24 out of engagement with the recess 15, the member 16 will move downwardly on the shaft 10 thereby minimizing or preventing injury to the driver of the vehicle. Obviously the resistance to movement of the member 16 and steering wheel 19 caused by engagement of the detent 24 in the recess 15 is insufficient to result in injury to the driver and any force sufficient to cause injury will result in downward movement of the steering wheel 19 and member 16 as fully described above.

While the upper end 12 of the shaft 10 and the member 16 are shown as rectangular in cross section, it is to be understood that other cross sectional shapes may be utilized and also if desired a splined connection may be provided between the member 16 and the shaft 10. The rectangular cross sectional shape is to be preferred however, since in this way frictional resistance to longitudinal sliding movement is minimized while at the same time relative rotation between the member 16 and the shaft 10 is prevented.

Since it is highly desirable in the event of an accident to deenergize the electrical system of a vehicle in order to prevent further movement of the same and also in order to minimize the danger of fire, there has been provided as an important part of this invention an electrical system control which may well comprise a normally closed switch 30 mounted on the bracket 14 and this switch may well comprise a fixed contact 31 carried by a portion 32 of the bracket 14 and a movable contact 33 carried by an arm 34 pivotally mounted at 35 on the bracket 14. An actuating arm in the form of a bell crank lever 36 is pivotally mounted at 37 on the portion 32 of the bracket 14 and the lever 36 is provided with one leg 38 disposed to pivotally move the arm 34 upon pivotal movement of the actuating lever 36 and the other leg 39 of the lever 36 extends into the path of movement of a disc 40 slidably mounted on the lower end 17 of the rectangular member 16 there being a set screw 41 provided to secure the disc 40 in adjusted position on the rectangular member 16.

As shown in Fig. 1 the disc 40 is spaced from the portion 39 of the actuating lever 36 and the switch 30 is closed thereby energizing the electrical system of the vehicle. In the event of an accident or if for any other reason the rectangular member 16 is moved downwardly on the shaft 10 for the full length of travel thereof the disc 40 will move into engagement with the portion 39 of the actuating lever 36 thereby pivotally moving the arm 34 to open the contacts 31 and 33 as clearly shown in Fig. 2 thereby completely deenergizing the electrical system of the vehicle to stop the motor and reduce danger of fire. Of course, the contacts 31 and 33 will be connected in series with one of the main supply cables of the electrical system. The disc 40 is of course so positioned on the rectangular member 16 that normal movement of the same to provide proper adjustment for a particular driver will not move the disc 40 into engagement with the actuating lever 36 to deenergize the electrical system.

It will be seen that by the above described invention there has been provided a relatively simple yet highly effective safety steering column and electrical system control for an automotive vehicle and also one providing convenient adjustment to suit the same to a particular driver and obviously this apparatus will serve to minimize or substantially prevent injury to the driver of a vehicle in the event of an accident and also to prevent further movement of the vehicle which might result in additional damage and at the same time substantially reduce the danger of fire.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A combination safety steering column and electrical system control for automotive vehicles comprising a tubular shaft of circular cross section for attachment adjacent the lower end to the steering mechanism of a vehicle, a supporting bracket for attachment to said vehicle and including a bearing rotatably receiving said shaft, said shaft terminating at the upper end in an elongated portion substantially rectangular in cross section, a plurality of longitudinally spaced recesses in one external surface of said rectangular portion, an elongated hollow member substantially rectangular in cross section, telescopically and slidably received at the lower end over the upper end of said shaft, the rectangular portion of said shaft engaging the inner surface of said member to prevent relative rotation therebetween while permitting relative longitudinal movement, a steering wheel fixed to the upper end of said member, said member having an aperture in one wall intermediate the length thereof, a detent disposed in said aperture and selectively engaging in one of said recesses, a portion of said detent projecting outwardly of said member, a collar surrounding said member, means for clamping said collar in adjusted position on said member, a leaf spring engaging said detent to urge the same inwardly of said member and having a portion disposed between said collar and said member to detachably secure said spring in place, whereby said detent will serve to releasably hold said member in adjusted longitudinal position relative to said shaft and upon application of a predetermined downward axial force on said steering wheel said member will slide downwardly on said shaft to prevent injury to the driver of said vehicle, an annular disc slidably received on the lower end of said member, means to secure said disc in adjusted position, a normally closed switch on said bracket for connection in series with a main supply cable of the electrical system of said vehicle, an actuating arm for said switch pivotally mounted on said bracket and projecting into the path of movement of said disc whereby upon downward movement of said member a predetermined distance said disc will engage said arm to open said switch and deenergize said electrical system.

2. A combination safety steering column and electrical system control for automotive vehicles comprising a shaft for attachment adjacent the lower end to the steering mechanism of a vehicle, a supporting bracket for attachment to said vehicle and including a bearing rotatably receiving said shaft, said shaft terminating at the upper end in an elongated portion polygonal in cross section, a plurality of longitudinally spaced recesses in said polygonal portion, an elongated hollow polygonal member telescopically and slidably received at the lower end over the upper end of said shaft, the polygonal portion of said shaft engaging the inner surface of said member to prevent relative rotation therebetween while permitting relative longitudinal movement, a steering wheel fixed to the upper end of said member, a detent carried by said member and selectively engaging in one of said recesses, resilient means engaging said detent to urge the same inwardly of said member, whereby said detent will serve to releasably hold said member in adjusted longitudinal position relative to said shaft and upon application of a predetermined downward axial force on said steering wheel said member will slide downwardly on said shaft to prevent injury to the driver of said vehicle, an annular disc slidably received on the lower end of said member, means to secure said disc in adjusted position, a normally closed switch on said bracket for connection in series with a main supply cable of the electrical system of said vehicle, an actuating arm for said switch pivotally mounted on said bracket and projecting into the path of movement of said disc whereby upon downward movement of said member a predetermined distance said disc will engage said arm to open said switch and deenergize said electrical system.

3. A combination safety steering column and electrical system control for automotive vehicles comprising a shaft for attachment adjacent the lower end to the steering mechanism of a vehicle, a supporting bracket for attachment to said vehicle and including a bearing rotatably receiving said shaft, said shaft terminating at the upper end in an elongated portion polygonal in cross section, a plurality of longitudinally spaced recesses in said polygonal portion, an elongated hollow polygonal member telescopically and slidably received at the lower end over the upper end of said shaft, the polygonal portion of said shaft engaging the inner surface of said member to prevent relative rotation therebetween while permitting relative longitudinal movement, a steering wheel fixed to the upper end of said member, a detent carried by said member and selectively engaging in one of said recesses, resilient means engaging said detent to urge the same inwardly of said member whereby said detent will serve to releasably hold said member in adjusted longitudinal position relative to said shaft and upon application of a predetermined downward axial force on said steering wheel said member will slide downwardly on said shaft to prevent injury to the driver of said vehicle, an abutment slidably received on the lower end of said member, means to secure said abutment in adjusted position, a normally closed switch on said bracket for connection in series with a main supply cable of the electrical system of said vehicle, actuating means for said switch projecting into the path of movement of said abutment whereby upon downward movement of said member a predetermined distance said abutment will engage said actuating means to open said switch and deenergize said electrical system.

References Cited in the file of this patent

UNITED STATES PATENTS

| | | |
|---|---|---|
| 887,701 | Schoening | May 12, 1909 |
| 2,197,671 | Vergara, Jr. | Apr. 6, 1940 |
| 2,639,626 | Snyder | May 26, 1953 |

FOREIGN PATENTS

| | | |
|---|---|---|
| 737,959 | Great Britain | Oct. 5, 1955 |